United States Patent
Biskeborn et al.

(10) Patent No.: US 9,299,368 B2
(45) Date of Patent: Mar. 29, 2016

(54) LOW FRICTION TAPE HEAD

(71) Applicant: International Business Machines Corporation, Armonk, NY (US)

(72) Inventors: Robert G. Biskeborn, Hollister, CA (US); Jason Liang, Campbell, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/468,251

(22) Filed: Aug. 25, 2014

(65) Prior Publication Data

US 2014/0362473 A1    Dec. 11, 2014

Related U.S. Application Data

(62) Division of application No. 12/831,149, filed on Jul. 6, 2010, now Pat. No. 8,861,132.

(51) Int. Cl.
*G11B 5/187* (2006.01)
*G11B 15/62* (2006.01)
*G11B 5/265* (2006.01)
*G11B 5/29* (2006.01)
(Continued)

(52) U.S. Cl.
CPC .............. *G11B 5/187* (2013.01); *G11B 5/1871* (2013.01); *G11B 5/255* (2013.01); *G11B 5/265* (2013.01); *G11B 5/29* (2013.01); *G11B 5/584* (2013.01); *G11B 5/60* (2013.01); *G11B 15/60* (2013.01); *G11B 15/62* (2013.01); *G11B 5/3106* (2013.01)

(58) Field of Classification Search
CPC .. G11B 5/00826; G11B 5/187; G11B 5/1871; G11B 5/255; G11B 5/3106; G11B 5/4893; G11B 5/584; G11B 5/60; G11B 15/60; G11B 15/62; G11B 15/64
USPC .......... 360/121, 122, 128, 129, 130.1, 130.21
See application file for complete search history.

(56) References Cited

U.S. PATENT DOCUMENTS 4,414,596 A    11/1983   Nakamichi
4,423,450 A    12/1983   Hamilton
(Continued)

FOREIGN PATENT DOCUMENTS

DE    3318902 A1    11/1984
JP    H0729141 A     1/1995
(Continued)

OTHER PUBLICATIONS

Restriction/Election Requirement from U.S. Appl. No. 12/831,149 dated Dec. 3, 2012.
(Continued)

*Primary Examiner* — Craig A. Renner
(74) *Attorney, Agent, or Firm* — Zilka-Kotab, PC

(57) ABSTRACT

A magnetic head according to one embodiment includes outer portions each having a tape bearing surface and an array of transducers selected from a group consisting of readers and writers; a central portion positioned between the outer portions, the central portion having a tape bearing surface and an array of transducers selected from a group consisting of readers and writers; wherein outer edges of the tape bearing surfaces of the outer portions are non-skiving, wherein an inner edge of each of the tape bearing surfaces of the outer portions is adapted for skiving air from the magnetic medium when the magnetic medium travels in a direction from the central portion towards the respective outer portion.

14 Claims, 4 Drawing Sheets

(51) Int. Cl.
  *G11B 5/584* (2006.01)
  *G11B 15/60* (2006.01)
  *G11B 5/255* (2006.01)
  *G11B 5/60* (2006.01)
  *G11B 5/31* (2006.01)

(56) References Cited

U.S. PATENT DOCUMENTS

| | | | |
|---|---|---|---|
| 4,439,793 | A | 3/1984 | Nater |
| 4,956,737 | A | 9/1990 | Brock |
| 4,967,300 | A | 10/1990 | Reid et al. |
| 5,034,838 | A | 7/1991 | Brock et al. |
| 5,175,660 | A | 12/1992 | Mitsuhashi et al. |
| 5,237,476 | A | 8/1993 | Bischoff et al. |
| 5,289,328 | A | 2/1994 | Saliba |
| 5,307,227 | A | 4/1994 | Okada et al. |
| 5,310,623 | A | 5/1994 | Gal |
| 5,452,165 | A | 9/1995 | Chen et al. |
| 5,475,553 | A | 12/1995 | Saliba |
| 5,502,528 | A * | 3/1996 | Czarnecki et al. ............ 396/319 |
| 5,566,075 | A | 10/1996 | Syouji et al. |
| 5,737,158 | A | 4/1998 | Tanaka et al. |
| 5,862,014 | A | 1/1999 | Nute |
| 5,883,770 | A | 3/1999 | Biskeborn et al. |
| 5,903,460 | A | 5/1999 | Syouji et al. |
| 5,905,613 | A | 5/1999 | Biskeborn et al. |
| 5,953,184 | A * | 9/1999 | Barber et al. ................. 360/121 |
| 6,018,444 | A | 1/2000 | Beck et al. |
| 6,038,108 | A | 3/2000 | Dee et al. |
| 6,118,626 | A | 9/2000 | Müftü et al. |
| 6,122,147 | A | 9/2000 | Fahimi et al. |
| 6,151,191 | A | 11/2000 | Müftü et al. |
| 6,282,055 | B1 | 8/2001 | Lakshmikumaran et al. |
| 6,301,051 | B1 | 10/2001 | Sankur |
| 6,341,416 | B1 | 1/2002 | Biskeborn et al. |
| 6,350,178 | B2 | 2/2002 | Weiss et al. |
| 6,400,521 | B1 | 6/2002 | Kaaden |
| 6,433,959 | B1 | 8/2002 | Lakshmikumaran et al. |
| 6,534,221 | B2 | 3/2003 | Lee et al. |
| 6,606,219 | B2 | 8/2003 | Lam |
| 6,624,960 | B1 | 9/2003 | Langiano et al. |
| 6,690,542 | B1 | 2/2004 | Wang |
| 6,700,733 | B1 | 3/2004 | Biskeborn |
| 6,760,199 | B2 | 7/2004 | Biskeborn |
| 6,781,792 | B2 | 8/2004 | Biskeborn |
| 6,972,931 | B2 | 12/2005 | Rudi et al. |
| 7,008,737 | B2 | 3/2006 | Morales et al. |
| 7,154,691 | B2 | 12/2006 | Girvin et al. |
| 7,209,324 | B2 | 4/2007 | Brock et al. |
| 7,239,465 | B1 | 7/2007 | Watson et al. |
| 7,271,983 | B2 | 9/2007 | Saliba |
| 7,359,156 | B2 | 4/2008 | Biskeborn |
| 7,414,811 | B2 | 8/2008 | Biskeborn |
| 7,464,757 | B2 | 12/2008 | Pessin et al. |
| 7,467,757 | B2 | 12/2008 | Biskeborn et al. |
| 7,585,596 | B1 | 9/2009 | Johnson et al. |
| 7,646,565 | B2 | 1/2010 | Biskeborn et al. |
| 7,656,602 | B2 | 2/2010 | Iben et al. |
| 7,660,072 | B2 | 2/2010 | Biskeborn et al. |
| 7,724,465 | B2 | 5/2010 | Koeppe |
| 7,751,154 | B2 | 7/2010 | Wu |
| 8,373,944 | B2 | 2/2013 | Biskeborn |
| 8,542,460 | B2 | 9/2013 | Biskeborn et al. |
| 8,679,733 | B2 | 3/2014 | Biskeborn et al. |
| 8,861,132 | B2 | 10/2014 | Biskeborn et al. |
| 2002/0018964 | A1 | 2/2002 | Jerominek |
| 2003/0076631 | A1 | 4/2003 | Torline et al. |
| 2003/0154908 | A1 | 8/2003 | Webber et al. |
| 2003/0179499 | A1 | 9/2003 | Shinjo et al. |
| 2004/0095674 | A1 | 5/2004 | Yip et al. |
| 2004/0150915 | A1 | 8/2004 | Thomas, III et al. |
| 2004/0228034 | A1 | 11/2004 | Nakao et al. |
| 2005/0053844 | A1 | 3/2005 | Wu |
| 2005/0122631 | A1 | 6/2005 | Biskeborn et al. |
| 2005/0207062 | A1 | 9/2005 | Johnson |
| 2005/0284207 | A1 | 12/2005 | Biskeborn et al. |
| 2006/0232884 | A1 | 10/2006 | Biskeborn |
| 2006/0236295 | A1 | 10/2006 | Baba-Ali |
| 2007/0183091 | A1 | 8/2007 | Saliba |
| 2008/0049358 | A1 | 2/2008 | Biskeborn et al. |
| 2008/0062390 | A1 | 3/2008 | Zhang et al. |
| 2008/0170328 | A1 | 7/2008 | Kawakami et al. |
| 2008/0218903 | A1 | 9/2008 | Biskeborn |
| 2009/0189302 | A1 | 7/2009 | Fujita et al. |
| 2009/0231756 | A1 | 9/2009 | Koeppe |
| 2009/0231757 | A1 | 9/2009 | Biskeborn et al. |
| 2009/0268343 | A1 | 10/2009 | Biskeborn et al. |
| 2010/0053810 | A1 | 3/2010 | Biskeborn et al. |
| 2012/0008234 | A1 | 1/2012 | Biskeborn et al. |
| 2012/0183907 | A1 | 7/2012 | Biskeborn et al. |
| 2012/0300338 | A1 | 11/2012 | Biskeborn |

FOREIGN PATENT DOCUMENTS

| | | |
|---|---|---|
| JP | 2007029141 | 2/2007 |
| JP | 2007029141 A | 2/2007 |
| JP | 2007041024 | 2/2007 |
| WO | WO03105133 | 12/2003 |

OTHER PUBLICATIONS

Non-Final Office Action from U.S. Appl. No. 12/831,149 dated Dec. 21, 2012.
Final Office Action from U.S. Appl. No. 12/831,149 dated Jul. 12, 2013.
Ex Parte Quayle Office Action from U.S. Appl. No. 12/831,149 dated Mar. 14, 2014.
Notice of Allowance and Fee(s) Due from U.S. Appl. No. 12/831,149 dated Jun. 9, 2014.
Restriction/Election Requirement from U.S. Appl. No. 12/047,116 dated Feb. 15, 2011.
Non-Final Office Action from U.S. Appl. No. 12/047,116 dated Mar. 22, 2011.
Non-Final Office Action from U.S. Appl. No. 12/047,116 dated Sep. 6, 2011.
Final Office Action from U.S. Appl. No. 12/047,116 dated Dec. 21, 2011.
Non-Final Office Action from U.S. Appl. No. 12/047,116 dated Mar. 28, 2012.
Non-Final Office Action from U.S. Appl. No. 12/047,116 dated Aug. 14, 2012.
Final Office Action from U.S. Appl. No. 12/047,116 dated Jan. 30, 2013.
Notice of Allowance and Fee(s) Due from U.S. Appl. No. 12/047,116 dated May 15, 2013.
Restriction/Election Requirement from U.S. Appl. No. 13/009,758 dated Jan. 22, 2013.
Non-Final Office Action from U.S. Appl. No. 13/009,758 dated Apr. 9, 2013.
Final Office Action from U.S. Appl. No. 13/009,758 dated Sep. 9, 2013.
Supplemental Notice of Allowability from U.S. Appl. No. 13/009,758 dated Jan. 7, 2014.
Notice of Allowance and Fee(s) Due from U.S. Appl. No. 13/009,758 dated Nov. 6, 2013.
Dee, Richard H., "Magnetic Tape Recording Technology and Devices," 1998 IEEE, 1998 Int'l NonVolatile Memory Technology Conference, pp. 55-64.
Notice of Allowance and Fee(s) Due from U.S. Appl. No. 13/117,013 dated Oct. 9, 2012.
U.S. Appl. No. 12/047,116, filed Mar. 12, 2008, Biskeborn et al.
U.S. Appl. No. 12/831,149, filed Jul. 6, 2010, Biskeborn et al.
U.S. Appl. No. 13/009,758, filed Jan. 19, 2011, Biskeborn et al.
U.S. Appl. No. 13/117,013, filed May 26, 2011, Biskeborn et al.
Non-Final Office Action from U.S. Appl. No. 11/213,366, dated Aug. 24, 2007.
Restriction from U.S. Appl. No. 11/213,366, dated Feb. 6, 2008.
Final Office Action from U.S. Appl. No. 11/213,366, dated May 13, 2008.

(56) References Cited

OTHER PUBLICATIONS

Notice of Allowance from U.S. Appl. No. 11/213,366 dated Jun. 18, 2008.
Biskeborn et al., U.S. Appl. No. 12/111,666, filed Apr. 29, 2008.
Biskeborn, R.G., U.S. Appl. No. 12/125,767, filed May 22, 2008.
Biskeborn, R.G., U.S. Appl. No. 12/163,241, filed Jun. 27, 2008.
"AZ 9260 Photoresist (520CPS) (US)," Safety Data Sheet, Substance SXR 109902, Version 3.1, Revision Date Mar. 16, 2011, pp. 1-12.

* cited by examiner

LOW FRICTION TAPE HEAD

RELATED APPLICATIONS

This application is a divisional of U.S. patent application Ser. No. 12/831,149, filed Jul. 6, 2010, and which is herein incorporated by reference.

BACKGROUND

The present invention relates to data storage systems, and more particularly, this invention relates to a low friction tape head.

Business, science and entertainment applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical and convenient means of storing or archiving the data. Storage technology is continually pushed to increase storage capacity and storage reliability. Improvement in data storage densities in magnetic storage media, for example, has resulted from improved medium materials, improved magnetic read/write heads, improved error correction techniques and decreased areal bit sizes. The data capacity of half-inch magnetic tape, for example, is now measured in thousands of gigabytes on 2000 or more data tracks.

An important and continuing goal in the data storage industry is that of increasing the density of data stored on a medium. For tape storage systems, that goal has led to increasing the track density on recording tape, and decreasing the thickness of the magnetic tape medium. However, the development of higher performance tape drive systems has created various problems in the design of a tape head assembly for use in such systems.

For example, in the quest to develop tape media, the tape media having a thinner magnetic coating, the tape media has become smoother. However, smoother tape media has resulted in higher levels of static and running friction on the head. To exemplify, consider that in a tape drive system, a magnetic tape is moved over the surface of the tape head at high speed. If the tape is rough, this movement generally entrains a film of air between the head and tape. However, smoother tape media does not entrain as much air, resulting in more intimate contact between head and tape thereby increasing running friction.

Static friction, also known as "stiction," at the head-tape interface of a tape drive can be a significant issue. The stiction forces for smooth tapes can be so high that a drive cannot cause the tape medium to come free from the head. If excessive force is used to move the tape, the tape may become damaged or even break.

Solutions for the friction problem, such as, head patterning have been proposed, but such solutions add cost to existing tape drives.

BRIEF SUMMARY

A magnetic head according to one embodiment includes outer portions each having a tape bearing surface and an array of transducers selected from a group consisting of readers and writers; and a central portion positioned between the outer portions, the central portion having a tape bearing surface and an array of transducers selected from a group consisting of readers and writers. The outer edges of the tape bearing surfaces of the outer portions are non-skiving, and an inner edge of each of the tape bearing surfaces of the outer portions is adapted for skiving air from the magnetic medium when the magnetic medium travels in a direction from the central portion towards the respective outer portion.

A method according to one embodiment includes guiding a magnetic medium over a magnetic head at an angle at which the magnetic medium flies over a leading outer portion of the head, engages a leading edge of a tape bearing surface of a central portion of the head, and engages an inner edge of a tape bearing surface of a trailing outer portion of the head. The inner edge of the tape bearing surface of the trailing outer portions skives air from the magnetic medium when the magnetic medium travels in a direction from the central portion towards the trailing outer portion.

A method for setting a wrap angle according to one embodiment includes adjusting a guide position to overwrap a magnetic tape over an outer edge of a leading outer portion of a magnetic head having the leading outer portion, a trailing outer portion, and a central portion positioned between the outer portions, each portion having a tape bearing surface and an array of transducers selected from a group consisting of readers and writers: passing the magnetic tape over the head, the tape traveling in a direction from the leading outer portion towards the trailing outer portion; reading the magnetic tape using the leading outer portion; adjusting a wrap angle of the magnetic tape relative to the leading outer portion until the tape is no longer readable: determining a position of the guide when the tape becomes no longer readable; selecting a wrap angle based on the determined position of the guide; and setting the guide to provide the selected wrap angle.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

For a fuller understanding of the nature and advantages of the present invention, as well as the preferred mode of use, reference should be made to the following detailed description read in conjunction with the accompanying drawings.

Prior Art

Prior Art

DETAILED DESCRIPTION

Figure 1:
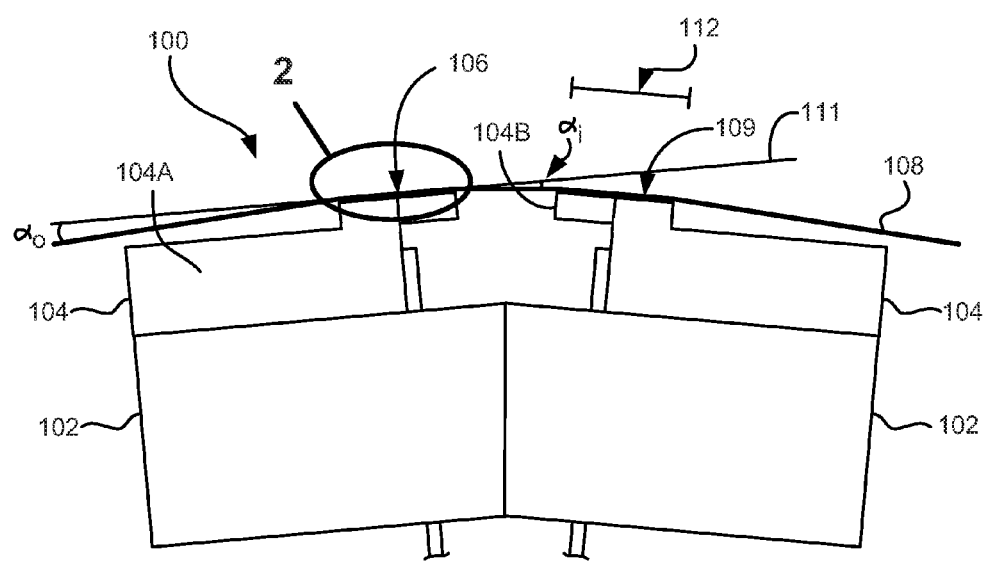
FIG. 1 illustrates a traditional flat-lapped magnetic tape head, in accordance with the prior art.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape-based storage systems, as well as operation and/or component parts thereof.

In one general embodiment, a magnetic data storage system includes a magnetic head; and guides on opposite sides of the magnetic head for directing a magnetic medium over the magnetic head. The magnetic head includes: outer portions each having a tape bearing surface and an array of transducers selected from a group consisting of readers and writers; and a central portion positioned between the outer portions, the central portion having a tape bearing surface and an array of transducers selected from a group consisting of readers and writers. An inner edge of each of the tape bearing surfaces of the outer portions is adapted for skiving air from the magnetic medium when the magnetic medium travels in a direction from the central portion towards the respective outer portion. The guides are oriented to direct the magnetic medium to fly over a leading one of the outer portions, engage a leading edge of the tape bearing surface of the central portion, and engage an inner edge of the tape bearing surface of a trailing one of the outer portions.

In another general embodiment, a magnetic head includes outer portions each having a tape bearing surface and an array of transducers selected from a group consisting of readers and writers; and a central portion positioned between the outer portions, the central portion having a tape bearing surface and an array of transducers selected from a group consisting of readers and writers. The outer edges of the tape bearing surfaces of the outer portions are non-skiving, and an inner edge of each of the tape bearing surfaces of the outer portions is adapted for skiving air from the magnetic medium when the magnetic medium travels in a direction from the central portion towards the respective outer portion.

In another general embodiment, a method includes guiding a magnetic medium over a magnetic head at an angle at which the magnetic medium flies over a leading outer portion of the head, engages a leading edge of a tape bearing surface of a central portion of the head, and engages an inner edge of a tape bearing surface of a trailing outer portion of the head. The inner edge of the tape bearing surface of the trailing outer portions skives air from the magnetic medium when the magnetic medium travels in a direction from the central portion towards the trailing outer portion.

In yet another general embodiment, a method for setting a wrap angle according to one embodiment includes adjusting a guide position to overwrap a magnetic tape over an outer edge of a leading outer portion of a magnetic head having the leading outer portion, a trailing outer portion, and a central portion positioned between the outer portions, each portion having a tape bearing surface and an array of transducers selected from a group consisting of readers and writers; passing the magnetic tape over the head, the tape traveling in a direction from the leading outer portion towards the trailing outer portion; reading the magnetic tape using the leading outer portion; adjusting a wrap angle of the magnetic tape relative to the leading outer portion until the tape is no longer readable; determining a position of the guide when the tape becomes no longer readable; selecting a wrap angle based on the determined position of the guide; and setting the guide to provide the selected wrap angle.

FIG. 1 illustrates a traditional flat-lapped bi-directional, two-module magnetic tape head 100, in accordance with the prior art. As shown, the head includes a pair of bases 102, each equipped with a module 104. The bases are typically "U-beams" that are adhesively coupled together. Each module includes a substrate 104A and a closure 104B with readers and writers 106 situated therebetween. In use, a tape 108 is moved over the modules along a tape bearing surface 109 in the manner shown for reading and writing data on the tape using the readers and writers. Conventionally, a partial vacuum is formed between the tape and the tape bearing surface for maintaining the tape in close proximity with the readers and writers.

Two common parameters are associated with heads of such design. One parameter includes the tape wrap angles $\alpha_i$, $\alpha_o$ defined between the tape and a plane 111 in which the upper surface of the tape bearing surface resides. It should be noted that the tape wrap angles $\alpha_i$, $\alpha_o$ include an inner wrap angle $\alpha_i$ which is often similar in degree to an external, or outer, wrap angle $\alpha_o$. The tape bearing surfaces of the modules are set at a predetermined angle relative to each other such that the desired inner wrap angle $\alpha_i$ is achieved at the facing edges. Moreover, a tape bearing surface length 112 is defined as the distance (in the direction of tape travel) between opposite edges of the tape bearing surface.

Figure 2:
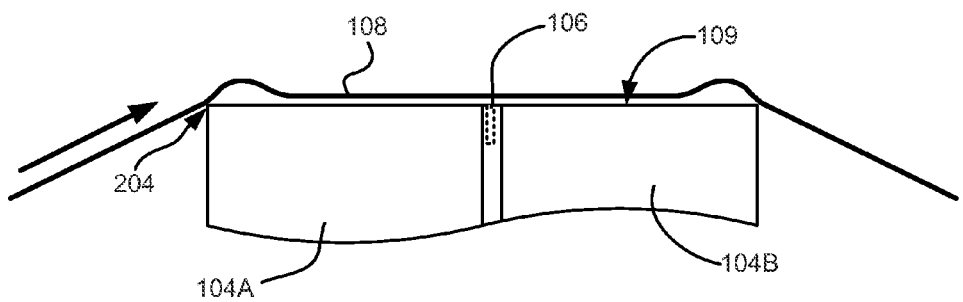
FIG. 2 is an enlarged view of Circle 2 of FIG. 1, showing a first known effect associated with the use of the head of FIG. 1.

During use of the head of FIG. 1, various effects traditionally occur. FIG. 2 is an enlarged view of the area encircled in FIG. 1. FIG. 2 illustrates a first known effect associated with the use of the head 100 of FIG. 1. When the tape 108 moves across the head as shown, air is skived from below the tape by a skiving edge 204 of the substrate 104A, and instead of the tape 108 lifting from the tape bearing surface 109 of the module (as intuitively it should), the reduced air pressure in the area between the tape and the tape bearing surface results from skiving and causes atmospheric pressure to urge the tape towards the tape bearing surface.

A problem with such designs is that running friction is added at each location where the tape wraps an edge, i.e., the four edges of the modules of FIG. 1. Particularly, at each wrapped edge, the contact pressure between the head and the tape is higher, resulting in higher rubbing friction. That ultimately requires more energy to pull the tape across the head. Moreover, multiple wraps put more stress on the tape and cause more tape wear.

Possibly the worst effect of wrapping the corners is that it can launch acoustic waves in the tape. Without wishing to be bound by any theory, it is believed that when asperities on the tape engage the skiving edges of the head, the tape tends to stick momentarily and then break free, thus launching the acoustic waves. The waves, in turn, causes the velocity of the tape at the head-tape interface to oscillate. Again, without wishing to be bound by any theory, the acoustic wave is a compressional wave running in the plane of the tape, resulting in a standing wave between tape supports and causing the tape velocity to oscillate at the head-tape interface. Though the resultant jitter at the tape-head interface is small, it is enough to cause detection problems. When the tape is running very slowly, this effect becomes more noticeable.

Figure 3:
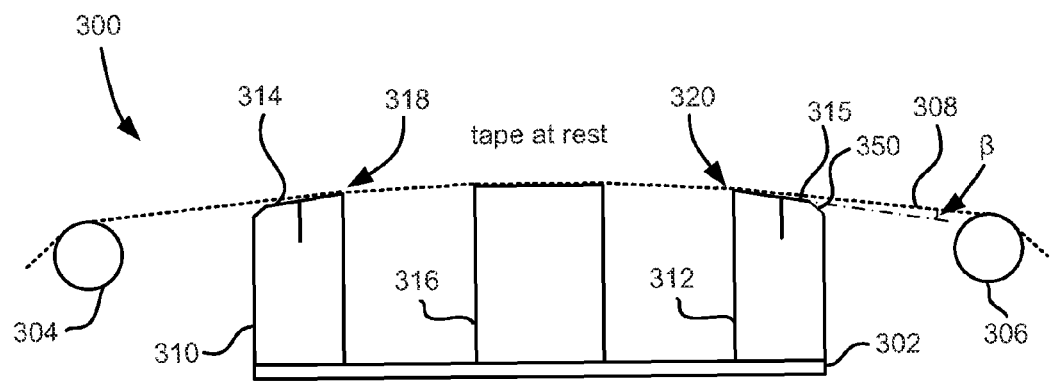
FIG. 3 is a side view of a magnetic tape head with three portions according to one embodiment of the present invention.

FIG. 3 illustrates a magnetic data storage system 300 according to one embodiment of the present invention that includes a magnetic head 302 and guides 304, 306 on opposite sides of the magnetic head for directing a magnetic medium 308 over the magnetic head. In the embodiment shown, the magnetic medium is a tape medium.

The magnetic head includes outer portions 310, 312, each having a tape bearing surface 314, 315 that is preferably flat lapped, and an array of transducers selected from a group consisting of readers and writers of any type, including those known in the art. A central portion 316 is positioned between the outer portions. The central portion also has a tape bearing surface and an array of transducers selected from a group consisting of readers and writers.

In FIG. 3, the medium is shown extending across the head and at rest (not in motion). The medium rests on the tape bearing surface of the central portion, and has minimal contact with the inner edges 318, 320 of each of the tape bearing surfaces of the outer portions. The position of the inner edges of each of the tape bearing surfaces of the outer portions relative to the plane of the tape bearing surface of the central portion determines the tape wrap angle between the plane of the tape and the tape bearing surface of the central portion. An illustrative tape wrap angle is between about 0.5° to about 2°.

Figure 4:
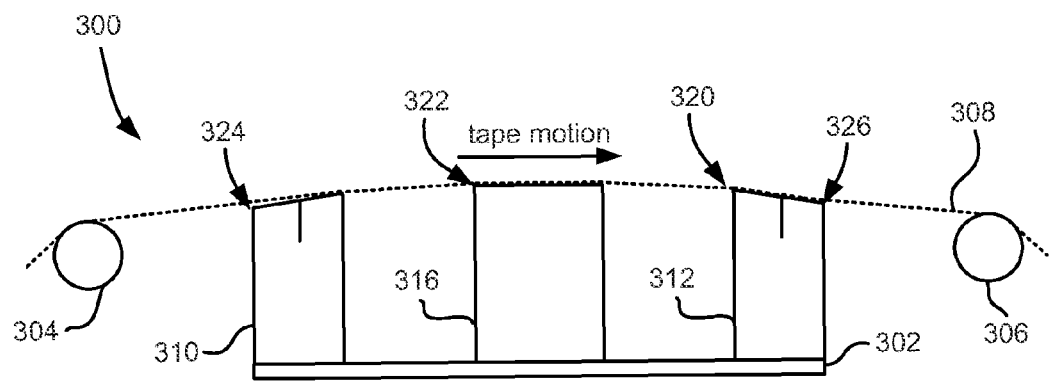
FIG. 4 is a side view of a magnetic tape head with three portions in use according to one embodiment of the present invention.

Referring to FIG. 4, the medium is shown travelling from left to right. The angle β (FIG. 3) of the tape bearing surface of the trailing outer portion 312 is adapted for skiving air from the magnetic medium when the magnetic medium travels as shown. The guides are oriented relative to the tape bearing surface of the nearest portion of the head with no wrap or a slight underwrap angle β (as shown in FIG. 3), which directs the medium to fly over the leading outer portion 310 with minimal (e.g., less than the at-rest) or no contact. The tape engages the leading edge 322 of the tape bearing surface of the central portion, and engages the inner edge of the tape bearing surface of a trailing one of the outer portions. An illustrative angle β between the medium in tension extending from the guide to the nearest outer portion and the tape bearing surface of the outer portion may be 0° to about 0.75°.

Thus, tape wrapping at edges of the tape bearing surfaces of the various portions in use is minimized, which in turn reduces the aforementioned problems of running friction and acoustic-like waves.

With continued reference to FIG. 4, the outer edge 324 of the tape bearing surface of the leading outer portion 310 is non-skiving, i.e., the outer edge of the leading outer portion does not skive air from the medium. This is a result of the guides being positioned as noted above. This is because the tape is spaced from the outer edge of the leading outer portion (slightly underwrapped), an air wedge develops, causing the medium to fly above the inner edge 318 of the leading outer portion.

Alternatively or to further enhance the formation of the air wedge, the outer edges of the tape bearing surfaces of the outer portions may be shaped, e.g. having a beveled edge 350 as shown on the outer portion 312 of FIG. 3. The beveled edge 350 encourages formation of an air wedge between the tape and the tape bearing surface, thereby allowing a broader set of approach angles for the tape, and/or allowing use of a no-wrap or even slightly overwrapped design where the tape approaches the leading outer portion in a plane parallel to or nearly parallel to the tape bearing surface of the leading outer portion.

The medium peels off the trailing outer portion 312 as it approaches the outer edge 326 of the trailing outer portion. Thus, little or no running friction is observed at the outer edge 326 of the trailing outer portion. It should also be noted that guide position is generally adjusted to ensure that the medium does not peel off so close to the downstream transducers that an intolerable spacing loss occurs.

Figure 5:
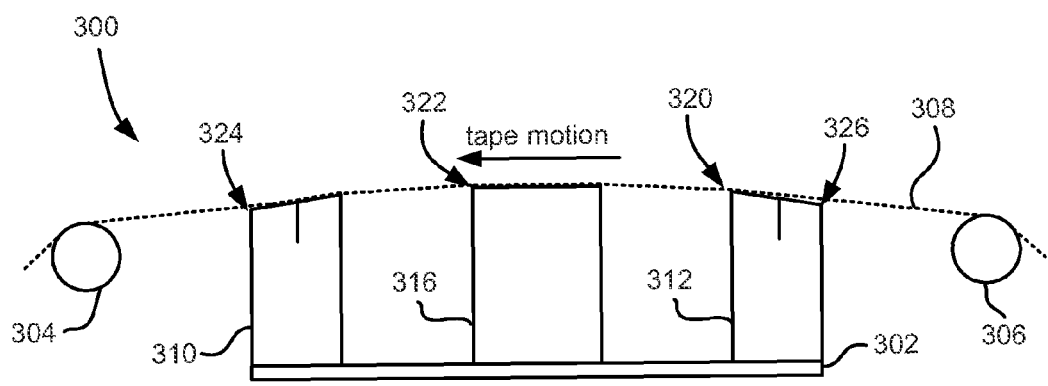
FIG. 5 is a side view of a magnetic tape head with three portions in use according to one embodiment of the present invention.

Referring to FIG. 5, it is seen that when the direction of medium travel is reversed, a similar effect is observed at the now-leading outer portion 312 and now-trailing outer portion 310.

Figure 6:
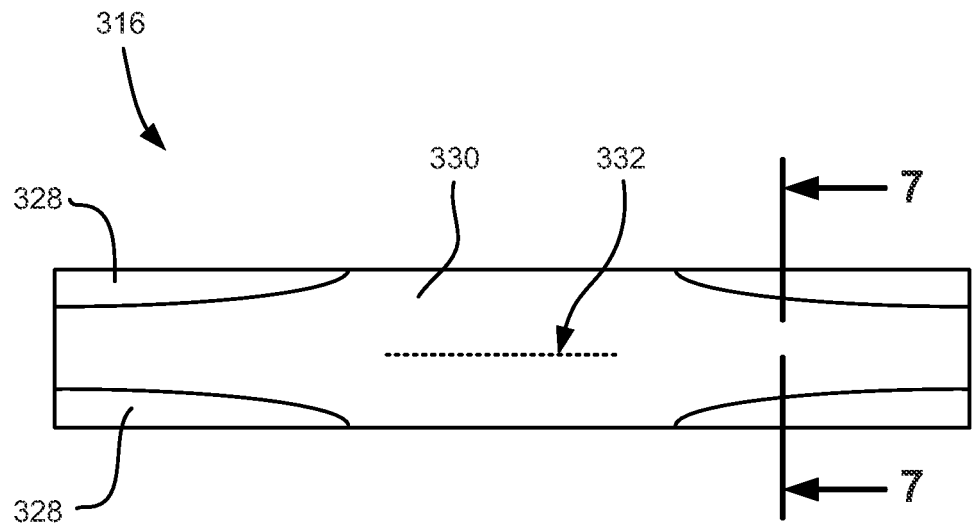
FIG. 6 is a tape bearing surface view of a portion of a tape head having patterning according to one embodiment.
Figure 7:
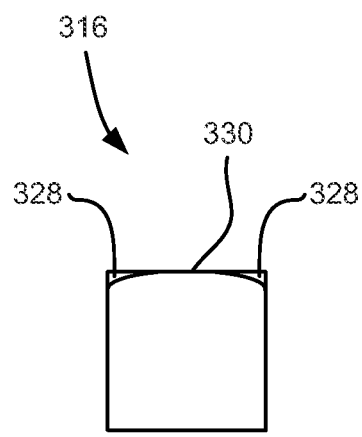
FIG. 7 is a cross sectional view taken from Line 7-7 of FIG. 6.

In one embodiment, at least one of the portions has patterning for inducing the magnetic medium to fly thereover in an area away from the transducers and/or to reduce stiction of the medium to the tape bearing surface of the portion (as compared to a smooth, planar tape bearing surface). Examples of patterning include texturing, beveling of sections of the tape bearing surface edge, formation of ridges or ribs thereon, formation of channels therein, etc. FIGS. 6 and 7 illustrate an example of a central portion 316 having patterning as can be achieved by tape lapping. In a tape lapping process, a tape having abrasive sections, e.g., of diamond, alumina, etc. is drawn over the portion to selectively abrade areas thereof. In this example, the abrasive tape would have abrasive strips flanking a central nonabrasive strip. As shown in the example of FIGS. 6 and 7, areas 328 of edges of the tape bearing surface 330 not aligned with the transducers 332 become beveled. The beveling promotes entrainment of air between the medium and the tape bearing surface. The sections of the edges of the tape bearing surface aligned with the transducers is not significantly affected by the tape lapping, and therefore retains its ability to skive air from the tape. In one illustrative embodiment, the central portion and outer portions have patterning with physical characteristics of being lapped by tape lapping.

In a read-write-read (R-W-R) configuration, outer reading portions flank a single writing portion. As the name implies, the outer portions include one or more arrays of readers, while the center portion includes one or more arrays of writers. Variations on the head include a R-W-R head, a R-R-W head, a W-W-R head, etc.

One or more servo readers may be positioned on one or more of the outer portions, the central portion, or a combination thereof. In one embodiment of a R-W-R configured head, the array of transducers of the central portion includes a plurality of writers and at least one servo reader calibrated to the position of one or more of the writers of the central portion. Such an embodiment exhibits better positioning of tracks during writing. The ability to position the tracks more accurately enables inclusion of more tracks on the tape, which may translate into higher areal density.

Any known method of calibrating the servo to one or more nearby transducers may be used. For example, the calibration may be performed magnetically, optically, etc. e.g., to determine a physical spacing between the servo and the transducer(s). Logic in the system then uses this measurement to precisely position the head relative to the servo tracks on the medium.

The position of the guides may be adjustable or fixed. Thus, in some approaches, the position of the guides may be set during manufacture and fixed, while in others the guides may be adjusted in the field, while in yet others, the guides may be set during manufacture and can be later adjusted in the field. Any known mechanism to fix the guides or make them adjustable may be used.

A method for setting a wrap angle according to one embodiment includes adjusting a guide position to overwrap a magnetic tape over an outer edge of a leading outer portion. For example, in FIG. 5, the guide 304 may be positioned to create an overwrap at edge 324. The trailing guide 306 may or may not be in an overwrap configuration. The magnetic tape is passed over the head, the tape traveling in a direction from the leading outer portion towards the trailing outer portion. The magnetic tape is read using the leading outer portion, and a wrap angle of the magnetic tape relative to the leading outer portion is adjusted until the tape is no longer readable. For example, the guide 304 may be raised up until the tape pops off of the leading outer portion 310. The position of the guide when the tape becomes no longer readable is determined. Typically, this will correspond to a wrap angle β of about 0°. The "in use" wrap angle β, to be used for data storage operations, is selected based on the determined position of the guide, and the guide is set to provide the selected wrap angle. As noted above, an illustrative "in use" wrap angle β between the medium in tension extending from the guide to the nearest outer portion and the tape bearing surface of the outer portion may be 0° to about 0.75°, but could be higher. Thus, the selected wrap angle may be the same as or greater than the wrap angle provided by the guide when the tape becomes no longer readable.

Conventional fabrication techniques may be used to create the various embodiments, such as thin film processing, lapping, etc.

Figure 8:
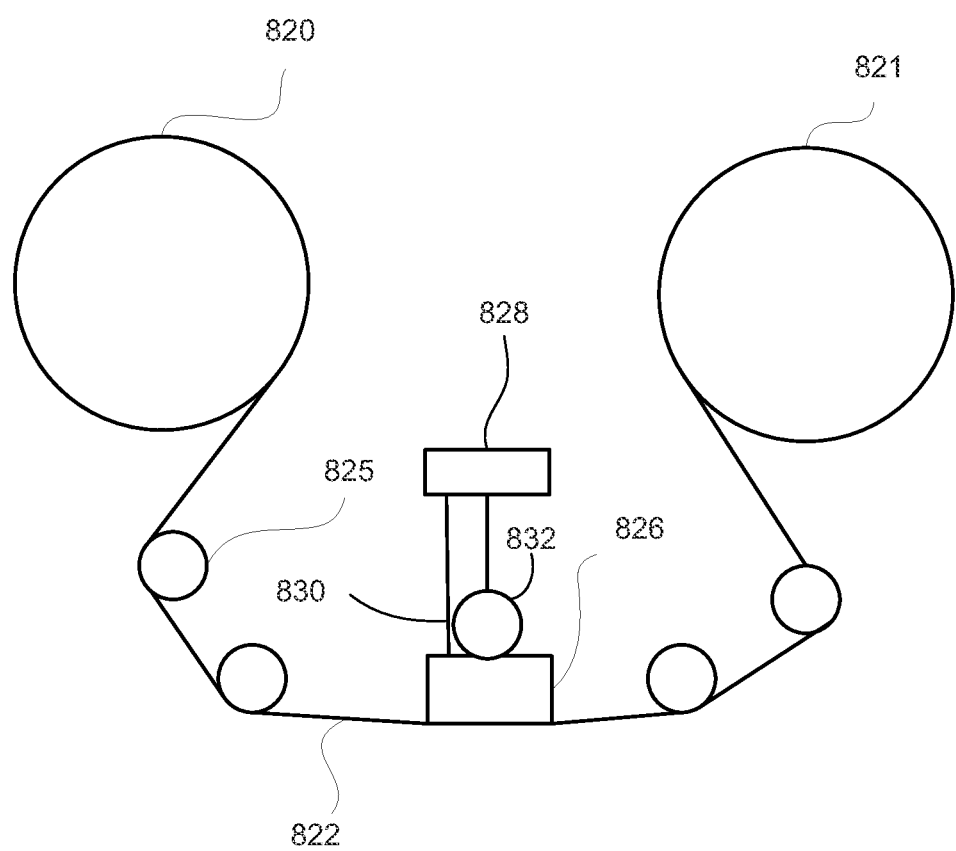
FIG. 8 is a schematic diagram of the tape drive system.

FIG. 8 illustrates a simplified tape drive which may be employed in the context of the present invention. While one specific implementation of a tape drive is shown in FIG. 8, it should be noted that the embodiments of the previous figures may be implemented in the context of any type of tape drive system.

As shown, a tape supply cartridge 820 and a take-up reel 821 are provided to support a tape 822. These may form part of a removable cassette and are not necessarily part of the system. Guides 825 guide the tape 822 across a preferably bidirectional tape head 826, of the type disclosed herein. Such tape head 826 is in turn coupled to a controller assembly 828 via a write-read cable 830. The controller 828, in turn, controls head functions such as servo following, writing, reading, etc. An actuator 832 controls position of the head 826 relative to the tape 822.

A tape drive, such as that illustrated in FIG. 8, includes drive motor(s) to drive the tape supply cartridge 820 and the take-up reel 821 to move the tape 822 linearly over the head 826. The tape drive also includes a read/write channel to transmit data to the head 826 to be recorded on the tape 822 and to receive data read by the head 826 from the tape 822. An interface is also provided for communication between the tape drive and a host (integral or external) to send and receive the data and for controlling the operation of the tape drive and communicating the status of the tape drive to the host, all as will be understood by those of skill in the art.

In one example of use, a magnetic data storage system guides a magnetic medium over a magnetic head at an angle at which the magnetic medium flies over a leading outer portion of the head, engages a leading edge of a tape bearing surface of a central portion of the head, and engages an inner edge of a tape bearing surface of a trailing outer portion of the head, where the inner edge of the tape bearing surface of the trailing outer portions skives air from the magnetic medium when the magnetic medium travels in a direction from the central portion towards the trailing outer portion.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
   outer portions each having a tape bearing surface and an array of transducers selected from a group consisting of readers and writers; and
   a central portion positioned between the outer portions, the central portion having a tape bearing surface having a planar upper-most surface and an array of transducers selected from a group consisting of readers and writers;
   wherein each of the tape bearing surfaces of the outer portions has a tape-engaging section configured and arranged relative to the tape bearing surface of the central portion to at least sometimes have contact with a tape passing thereover during normal use,
   wherein an inner edge of each of the tape bearing surfaces of the outer portions is physically oriented with respect to the tape bearing surface of the central portion to skive air from the tape when the tape travels in a direction from the central portion towards the respective outer portion,
   wherein an angle is formed between the tape bearing surface of each of the outer portions such that the distance between the tape and the respective tape bearing surface increases from the associated skiving edge toward an outer edge of the respective tape bearing surface when the tape is at rest and in tension.

2. The apparatus as recited in claim 1, wherein outer edges of the tape bearing surfaces of the outer portions are beveled.

3. The apparatus as recited in claim 1, wherein the array of transducers of the central portion includes a plurality of writers and at least one servo reader calibrated to the position of one or more of the writers of the central portion.

4. The apparatus as recited in claim 1, wherein at least one of the portions has patterning for at least one of inducing the tape to fly thereover in an area away from the transducers and reducing stiction of the tape to the tape bearing surface of the at least one portion.

5. The apparatus as recited in claim 4, wherein the patterning has physical characteristics of being lapped by tape lapping.

6. The apparatus as recited in claim 1, wherein the tape contacts the tape bearing surface of the central portion and only the inner edge of each of the tape bearing surfaces of the outer portions when the tape is not in motion and is extended across all of the portions.

7. The apparatus as recited in claim 1, wherein the central portion includes an array of writers, wherein the outer portions each have an array of readers.

8. The apparatus as recited in claim 1, wherein at least one of the portions has patterning for inducing the tape to fly thereover in an area away from the transducers, the patterning including beveled edges of the tape bearing surface of the at least one of the portions in the area away from the transducers and a skiving edge in an area proximate the transducers.

9. The apparatus as recited in claim 1, wherein at least one of the portions has patterning for at least one of inducing the tape to fly thereover in an area away from the transducers and reducing stiction of the tape to the tape bearing surface of the at least one portion, the patterning including texturing.

10. The apparatus as recited in claim 1, wherein the tape bearing surface of the central portion is continuously planar between outer tape-engaging edges thereof in an area of the tape bearing surface immediately proximate the transducers.

11. The apparatus as recited in claim 10, wherein the tape bearing surface of the central portion has beveled edges in an area of the tape bearing surface away from the transducers.

12. The apparatus as recited in claim 1, wherein the tape bearing surface of each outer portion is continuously planar between outer edges thereof in an area of the tape bearing surface immediately proximate the transducers.

13. The apparatus as recited in claim 1, comprising:
a drive mechanism for passing a tape over the portions; and
a controller electrically coupled to the transducers.

14. The apparatus as recited in claim 1, wherein the tape bearing surface of each of the outer portions is planar.

* * * * *